3,324,179
PRODUCTION OF CARBOXYLIC AMIDES
Heinrich Scholz, Max Strohmeyer, and Erich Haarer, Ludwigshafen (Rhine), Germany, assignors to Badische Anilin- & Soda-Fabrik Aktiengesellschaft, Ludwigshafen (Rhine), Germany
No Drawing. Filed Oct. 31, 1963, Ser. No. 320,498
Claims priority, application Germany, Nov. 3, 1962, B 69,478
8 Claims. (Cl. 260—561)

This invention relates to a new process for the continuous production of carboxylic amides from carboxylic esters and amines.

It is known that formamides can be prepared by reacting carboxylic esters with ammonia or primary or secondary amines. For this reaction use is made of the fact that the equilibrium of the reaction carboxylic

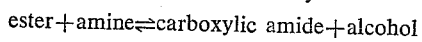
ester+amine⇌carboxylic amide+alcohol can be extensively displaced in favor of the carboxylic amide and alcohol. On an industrial scale, the process is usually carried out either in vessels fitted with stirrers or continuously by passing the initial mixture through tubes heated to the reaction temperature. Pure carboxylic amide is then recovered from the reaction mixture in at least two columns and as a rule in three columns. This process involves high equipment costs. Naturally, the cost of power is also considerable.

It is an object of this invention to provide a process which can be carried out in a simple apparatus. It is another object of the invention to provide a process which operates with a low energy requirement. Other objects and advantages of the invention will be apparent from the following description.

In accordance with this invention the said objects and advantages are achieved by introducing a carboxylic ester and a primary or secondary amines, separately or in admixture, into a reaction zone within a reaction column in which, below and above the point of supply of the said initial materials there is a countercurrent of ascending vaporous products and descending liquid products, the temperatures in the reaction column decreasing from the bottom to the top and being at the most 220° C. at the bottom and at least 20° C. at the top, removing only a part of the top product at a minimum reflux ratio of 2:1, and withdrawing the carboxylic amide obtained from a point below the said point of supply.

The reaction according to this invention is carried out in a single column, the reaction of the initial materials and the working up of the reaction mixture being combined in one process step. The equipment is simple and the energy requirement low. The heat of reaction is utilized so that only a small amount of heat has to be supplied to keep the reaction mixture at the reaction temperature and to separate the alcohol formed by the reaction. Moreover there is a saving in cooling water. Many carboxylic amides, such as formamide, are thermally sensitive. Purer products are obtained by the process according to this invention because the period during which the carboxylic amide is at elevated temperature is shortened. Surprisingly, it is possible to react the carboxylic ester practically quantitatively even when using an amide which is more volatile than the alcohol formed during the reaction.

In the bottom part of the reaction column there is usually practically pure carboxylic amide in addition to amine if this is difficultly volatile, and the temperature is the boiling temperature of the carboxylic amide at the pressure chosen. Above this zone is the reaction zone in which the temperature is only slightly lower, usually between 120 and 200° C. In addition to the carboxylic amide, the reaction zone contains varying amounts of carboxylic ester, alcohol and amine increasing toward the top. Above the reaction zone the temperature is considerably lower. This zone usually contains alcohol and amine, if the latter is used in excess and is not more difficultly volatile than the carboxylic amide. It is to be understood that the length of the said zones varies according to the type of initial material, the amount supplied per unit of time, the reflux ratio and the temperatures used, so that universally applicable data cannot be given.

The carboxylic esters may be derived from aliphatic, cycloaliphatic, araliphatic, aromatic or heterocyclic carboxylic acids. Carboxylic esters of lower aliphatic alcohols are usually employed. Preferred carboxylic esters are those derived from fatty acids having one to four carbon atoms and alkanols having one to four carbon atoms. Specific examples are: methyl formate, ethyl formate, butyl formate, methyl acetate, ethyl caproate, ethyl stearate, ethyl cyclohexyl carboxylate, ethyl phenylacetate, methyl benzoate, ethyl p-toluate, 2-methoxyethyl p-toluate, and the ethyl ester of pyridine-2-carboxylic acid.

Examples of suitable amines are: methylamine, dimethylamine, ethylamine, diethylamine, dibutylamine, bis-β-hydroxyethylamine, bis-β-methoxyethylamine, stearylamine, cyclohexylamine, dicyclohexylamine, benzylamine, benzylmethylamine, aniline, N-methylaniline, p-nitroaniline, and 2 - aminopyridine. Preferred amines are primary and secondary amines having one to twelve carbon atoms which, apart from the amine nitrogen atom, have hydrocarbon structure or have additionally one or two hydroxyl groups or one or two ether bridges. Particularly good results are obtained with primary or secondary amines having one or two carbon atoms, i.e. with methylamine, dimethylamine and ethylamine.

The carboxylic esters and the amines may be used in about stoichiometric amounts. It is advantageous to use the amine in excess however, the excess being up to about double the molar amount. Carboxylic ester and amine may be supplied to the reaction column separately or mixed together. In the latter case the temperature of the mixture prior to introduction into the reaction column should not exceed about 50° C. so that the actual reaction does not occur until the reactants are in the reaction column. Separate supply of the reactants is particularly recommended when a considerable amount of heat is liberated when they are mixed so that it is necessary to cool the mixture if the temperature thereof is to be kept lower than about 50° C. If the initial materials are supplied separately in such a case, the heat liberated by mixing is utilized for separating the reaction mixture into its components.

It is an essential feature of the process according to the invention that the alcohol is withdrawn at a higher level than the point of supply of the initial materials to the reaction column, and the carboxylic amide is withdrawn at a lower level than the said point. Both above and below the point of supply of the initial materials there is a countercurrent of ascending vaporous products and descending liquid products. Rectification conditions thus exist in the reaction column. These are maintained by returning a portion of the condensed top product of the reaction column which consists mainly of alcohol. It would have seemed that the return of alcohol should be avoided because it displaces the equilibrium in favor of the carboxylic ester. Surprisingly, however, practically pure carboxylic amide is obtained in spite of this return. It is advantageous to use a reflux ratio of 2:1 to 30:1, advantageously 2:1 to 10:1. The reflux ratio 30:1 is not a critical limit. It is clear however that an unnecessarily high consumption of energy is involved with higher reflux ratios.

It is recommended that the withdrawal of the top product, the withdrawal of the carboxylic amide and the supply of the initial materials should be so correlated that there are at least three, advantageously at least five, theoretical trays between the withdrawal of the top product and the supply of the initial materials, and at least 3, advantageously at least 5 theoretical trays between the withdrawal of the carboxylic amide and the supply of the initial materials. When these conditions are fulfilled, the presence of carboxylic ester in the carboxylic amide and the top product of the reaction column is reliably avoided. It is clear in this case also that no critical upper limit can be given for the number of theoretical trays. Naturally unnecessary expenditure for apparatus is avoided and for this reason in a normal case not more than 16 theoretical trays will be provided above the point of supply of the initial materials and not more than 8 theoretical trays below the said point of supply and above the point of withdrawal of the carboxylic amide.

The desired reaction temperature may be controlled for a given reaction product by the pressure which prevails in the reaction zone. It is usual to work at atmospheric pressure and subatmospheric pressure is usually only employed in the case of carboxylic amides which have very high boiling points or which tend to decompose at atmospheric pressure.

The process according to this invention may be carried out in columns conventionally used in industry, for example sieve-plated columns, bubble tray columns and packed columns. The alcohol which distills off at the top of the column may be used for the production of fresh carboxylic ester. The carboxylic amide withdrawn from the bottom or lower portion of the column is in many cases sufficiently pure for it to be used direct without further purification.

Carboxylic amides are known to have manifold uses in industry. Carboxylic amides of low molecular weight, such as dimethlformamide, have become known as solvents, for example for polacrylonitriles. Carboxylic amides are also important intermediates for synthesis of a great variety of kinds, for example for the production of dyes and pest control agents.

The invention is further illustrated by the following examples. The parts in the examples are parts by weight.

*Example 1*

400 parts of dimethylformamide is placed in a column having thirty-five bubble trays (degree of efficiency of a tray 0.75). The dimethylformamide is heated under reflux and then 610 parts of dimethylamine and 660 parts of methyl formate are introduced separately into the column within twenty minutes at the level of the twelfth tray. The temperature within the reaction zone, which extends up to about the twenty-first tray, is 155° C. on an average. 515 parts of condensed volatile components (mainly methanol) is withdrawn in the course of 20 hours continuously from the top of the column (temperature 65° C.) and 1170 parts of pure reaction product is withdrawn in the same period from the sixth tray (temperature 155° C.), the reaction product consisting to the extent of 99.85% of dimethylformamide according to investigation by gas chromatography. The yield is 95% of the theory with reference to methyl formate. 2050 parts of condensed volatile components is returned per hour as a reflux, the reflux ratio thus being about 4:1.

*Example 2*

Monoethylamine and methyl formate are reacted to form monoethylformamide in the way described in Example 1. 300 parts of monoethylformamide is placed in the column; the temperature of the reaction zone is about 185° C. 312 parts of monoethylamine and 428 parts of methyl formate are introduced within fifteen hours. The reflux ratio is 8:1. 300 parts of methanol is withdrawn from the top of the column (temperature 65° C.) and 730 parts of pure monoethylformamide is withdrawn from the fifth tray (temperature 190° C.) The yield is 82.5% of the theory with reference to methyl formate.

*Example 3*

Diethylamine and methyl formate are reacted in the way described in Example 1. 368 parts of diethylformamide is placed in the column; the temperature in the reaction zone is 170° C. 163 parts of methanol is obtained as top product (boiling point 65° C.) and 863 parts of pure diethylformamide is withdrawn from the fifth tray (temperature 175° C). The reflux ratio is 10:1. The yield is 96.5% of the theory with reference to methyl formate.

*Example 4*

Dibutylamine and methyl formate are reacted in the way described in Example 1. 250 parts of dibutylformamide is placed in the column; the reaction temperature in the reaction zone is about 185° C. A mixture of 432.5 parts of dibutylamine and 167.5 parts of methyl formate is introduced within eight hours. The temperature at the bottom of the column is 244° C. 92 parts of a readily volatile fraction is withdrawn from the top, consisting to the extent of 99% of methanol (boiling point 65° C.). 758 parts of bottom product is obtained, from which by distillation 673 parts of pure dibutylformamide is obtained, corresponding to 96.5% of the theory with reference to methyl formate. 50 parts of dibutylamine is also recovered. The reflux ratio is 7:1.

*Example 5*

500 parts of cyclohexylformamide is placed in a column having 40 bubble trays and is heated to 155° C. at 90 mm. 150° C. and 11 mm. Hg. A mixture of 1187 parts of cyclohexylamine and 720 parts of methyl formate per hour is introduced into the column at the sixth tray. The temperature at the top of the column is 20° C. and at the bottom 160° C. 385 parts of methanol is withdrawn while 800 parts is returned to the top. 1478 parts of crude cyclohexylformamide is withdrawn at the bottom of the column. This is distilled at a pressure of 9.5 mm. Hg for purification. From 1478 parts of crude product, 1468 parts of pure distillate having the boiling point 138° to 142° C. is obtained which according to gas chromatography consists to the extent of 100% of cyclohexylformamide. The yield is 96.3% of the theory with reference to methyl formate.

*Example 6*

400 parts of N-ethylacetamide is placed in a column having thirty-six bubble trays, and kept under reflux at Hg. A mixture of 223 parts of methyl acetate and 136 parts of ethylamine is introduced in the course of 6 hours into the column at the twelfth tray. A temperature gradient condensate is withdrawn at the top of the column while 1450 parts is returned to the top of the column. During the same period, 130 parts of liquid is withdrawn from the bottom. This is distilled at 24 mm. Hg 115 parts of pure ethylacetamide having the boiling point 113° to 118° C. is obtained, i.e. a yield of 43.8% of the theory with reference to methyl acetate.

We claim:

1. A process for the continuous production of a carboxylic acid amide which comprises: introducing as initial materials
    (A) a carboxylic acid ester of a fatty acid of 1 to 4 carbon atoms and an alkanol of 1 to 4 carbon atoms, and
    (B) an amine selected from the group consisting of hydrocarbon primary and secondary amines of 1 to 12 carbon atoms into a reaction zone arranged in a reaction column so as to provide a countercurrent flow of ascending vaporous products and descending liquid products both above and below the point of supply of said initial materials, the temperature in said reaction column decreasing from the bottom to the top of said column and being at the most 220° C. at the bottom and at least 20° C. at the top; removing only a part of the top product consisting mainly of alcohol at a minimum reflux ratio of 2:1; and withdrawing the carboxylic acid amide obtained as a product at point below said point of supply.

2. A process as claimed in claim 1 wherein said reaction column has at least 3 theoretical trays between the point of supply of the initial materials and the point of withdrawal of said top product, and at least 3 theoretical trays between said point of supply and the point of withdrawal of said carboxylic acid amide product.

3. A process as claimed in claim 1 wherein said reflux ratio is about 2:1 to 10:1.

4. A process as claimed in claim 1 where (A) is methyl formate and (B) is dimethyl amine.

5. A process as claimed in claim 1 wherein (A) is methyl formate and (B) is monoethylamine.

6. A process as claimed in claim 1 wherein (A) is methyl formate and (B) is diethylamine.

7. A process as claimed in claim 1 wherein (A) is methyl formate and (B) is dibutylamine.

8. A process as claimed in claim 1 wherein (A) is methyl formate and (B) is cyclohexylamine.

References Cited

UNITED STATES PATENTS 3,072,725   1/1963   Surman _____ 260—561

OTHER REFERENCES

Hengsteback Distillation, pp. 17–23. New York, Reinhold, 1961.

WALTER A. MODANCE, *Primary Examiner.*

NATALIE TROUSOF, *Assistant Examiner.*

UNITED STATES PATENT OFFICE
CERTIFICATE OF CORRECTION

Patent No. 3,324,179                        June 6, 1967

Heinrich Scholz et al.

It is hereby certified that error appears in the above numbered patent requiring correction and that the said Letters Patent should read as corrected below.

Column 1, line 17, for "reaction carboxylic" read -- reaction: --; line 18, before "ester" insert -- carboxylic --; line 37, for "amines" read -- amine --; column 4, lines 36 and 37, strike out "40 bubble trays and is heated to 155° C. at 90 mm. 150° C. and 11 mm. Hg." and insert instead -- thirty-six bubble trays, and kept under reflux at 150° C. and 11 mm. Hg. --; same column 4, line 52, beginning with "400 parts of" strike out all to and including "top of the column." in line 58, same column 4, and insert instead 400 parts of N-ethylacetamide is placed in a column having 40 bubble trays and is heated to 155° C. at 90 mm. Hg. A mixture of 223 parts of methyl acetate and 136 parts of ethylamine is introduced in the course of 6 hours into the column at the twelfth tray. A temperature gradient of 20° to 155° C. is set up in the column. 480 parts of condensate is withdrawn at the top of the column while 1450 parts is returned to the top of the column.

Signed and sealed this 25th day of June 1968.

(SEAL)
Attest:

EDWARD M. FLETCHER, JR.
Attesting Officer

EDWARD J. BRENNER
                                             Commissioner of Patents